(12) United States Patent
Luan et al.

(10) Patent No.: US 8,119,702 B2
(45) Date of Patent: Feb. 21, 2012

(54) RESIN COMPOUND CONTAINING A FUNCTIONALIZED POLYPROPYLENE AND A FUNCTIONALIZED STYRENIC THERMOPLASTIC ELASTOMER

(75) Inventors: Shifang Luan, Changchun (CN); Jinghua Yin, Changchun (CN); Zhongzhi Li, Changchun (CN); Jianwei Wang, Changchun (CN); E Zhang, Changchun (CN); Huawei Yang, Changchun (CN)

(73) Assignee: Changchun Institute of Applied Chemistry Chinese Academy of Sciences, Changchun, Jilin Province (CN)

( * ) Notice: Subject to any disclaimer, the term of this patent is extended or adjusted under 35 U.S.C. 154(b) by 23 days.

(21) Appl. No.: 12/891,531

(22) Filed: Sep. 27, 2010

(65) Prior Publication Data
US 2011/0288236 A1    Nov. 24, 2011

(30) Foreign Application Priority Data
May 21, 2010   (CN) .......................... 2010 1 0178834

(51) Int. Cl.
C08L 51/06    (2006.01)
C08L 51/04    (2006.01)
C08L 53/02    (2006.01)

(52) U.S. Cl. ........ 522/102; 522/103; 522/112; 522/114; 522/116; 525/71; 525/73; 525/74

(58) Field of Classification Search ................... 521/102, 521/103, 112, 114, 116; 525/71, 73, 74, 525/98
See application file for complete search history.

(56) References Cited

U.S. PATENT DOCUMENTS 4,561,110 A    12/1985   Herbert
5,670,558 A *   9/1997   Onishi et al. .................. 523/112
5,683,768 A    11/1997   Shang et al.

* cited by examiner

Primary Examiner — Jeffrey Mullis
(74) Attorney, Agent, or Firm — Knobbe, Martens, Olson & Bear, LLP

(57) ABSTRACT

The present invention provides a resin composition consisting of a functionalized polypropylene (PP) and a functionalized styrenic thermoplastic elastomer (TPS). The functionalized PP is a PP grafted with N-vinyl pyrrolidone (NVP) and glycidyl methacrylate (GMA), and the functionalized TPS is a TPS grafted with acrylamide or methacrylamide. The functionalized PP and the functionalized TPS are subjected to melt blending to obtain the resin composition with a slight cross-linking structure due to the reaction between GMA and acrylamide or methacrylamide, therefore the resin composition presents good physical properties. Besides, the resin composition without additional plasticizer or other small molecular organic compounds can be utilized in blood bags, blood transfusion and collection apparatuses, etc. Thus, it does not release small molecular substances which are of potential harm to human body during use.

10 Claims, No Drawings

RESIN COMPOUND CONTAINING A FUNCTIONALIZED POLYPROPYLENE AND A FUNCTIONALIZED STYRENIC THERMOPLASTIC ELASTOMER

CROSS-REFERENCE TO RELATED PATENT APPLICATION

This application claims the benefit of Chinese Patent Application Number 201010178834.3 filed on May 21, 2010, the disclosure of which is hereby expressly incorporated by reference in its entirety and hereby expressly made a portion of this application.

FIELD OF THE INVENTION

The present invention relates to the field of biomedical material science. More particularly, the invention relates to a resin composition.

BACKGROUND OF THE INVENTION

Blood bags, blood transfusion and collection apparatuses as well as components contacting with blood are popularly made of polyvinyl chloride (PVC). In order to improve flexibility and elasticity of PVC for the production of blood storage and transfusion apparatus, it is usually plasticized with di(2-ethylhexyl) phthalate (DEHP). Besides, DEHP plasticizer or the like has a function of stabilizing erythrocyte membrane and decreasing erythrocyte hemolysis, thus benefiting blood storage and transfusion. However, a minute amount of DEHP might enter blood through diffusion or extraction, harming human body such as nervous system, reproductive system, blood circulation system, kidney, etc.

Due to the uncertain safety for manufacturing blood storage and transfusion apparatuses with DEHP-plasticized PVC, the prior art disclose a variety of other materials which can be used for blood storage and transfusion apparatuses. U.S. Pat. No. 4,561,110 discloses a polyolefin/ethylene-ethylene acetate copolymer (EVA) alloy for fabricating a blood storage bag. However, the alloy does not have a good mechanical strength, and the blood storage bag fabricated is prone to damaging, leaking or the like during practical application. U.S. Pat. No. 5,683,768 discloses a technique of polypropylene (PP)/styrene-b-(ethylene-co-butylene)-b-styrene (SEBS)/nylon (PA) alloy used as blood storage material. The alloy has a good thermal resistance but poor transparency. Also, the polyolefin alloys reported in the above patents do not have good blood compatibility, i.e. poor anti-hemolysis and anti-coagulation performances, and are difficult to meet the requirement of blood storage.

SUMMARY OF THE INVENTION

An object of the present invention is to provide a resin composition, and the resin composition presented in the invention has excellent physical performance and good blood compatibility.

The present invention provides a resin composition consisting of a functionalized polypropylene (PP) and a functionalized styrenic thermoplastic elastomer (TPS).

The functionalized PP is a PP grafted with N-vinyl pyrrolidone (NVP) and glycidyl methacrylate (GMA), and the functionalized TPS is a TPS grafted with acrylamide or methacrylamide.

Preferably, the functionalized PP and the functionalized TPS are used in a ratio of 1:2-1:5 by weight.

Preferably, the amount of NVP is 2%-10% by weight of PP to be grafted.

Preferably, the amount of GMA is 3%-8% by weight of PP to be grafted.

Preferably, PP is a copolymer of propylene with ethylene.

Preferably, the amount of acrylamide or methacrylamide is 1%-6% by weight of TPS to be grafted.

Preferably, TPS is styrene-b-(ethylene-co-butylene)-b-styrene (SEBS), styrene-b-(ethylene-propylene)-b-styrene (SEIS) or styrene-b-(ethylene-butylene-propylene)-b-styrene (SEBIS).

Preferably, TPS has a styrene segment content of 10%-40% by weight.

Preferably, the preparation of the functionalized PP includes the steps as follows: PP is subjected to pre-irradiation; the pre-irradiated PP, NVP and GMA are subjected to melt blending to obtain the functionalized PP.

Preferably, the preparation of the functionalized TPS includes the steps as follows: TPS is subjected to pre-irradiation; the pre-irradiated TPS, acrylamide or methacrylamide is subjected to melt blending to obtain the functionalized TPS.

The present invention provides a resin composition consisting of a functionalized PP and a functionalized TPS with respect to the prior art. The functionalized PP is a PP grafted with N-vinyl pyrrolidone (NVP) and glycidyl methacrylate (GMA). The functionalized TPS is a TPS grafted with acrylamide or methacrylamide. The functionalized PP and the functionalized TPS are subjected to melt blending to obtain the composition with a slight cross-linking structure due to the reaction between GMA and acrylamide or methacrylamide, therefore the resin composition presents good physical properties such as transparency, elongation at break, gas permeation, etc.

The resin composition presented in the present invention is introduced with NVP, thus improving the resin composition's compatibility with blood and its blood storage performance. The resin composition without additional plasticizer or other small molecular organic compounds can be utilized in blood bags, blood transfusion and collection apparatuses, etc. Thus, it does not release small molecular substances which are of potential harm to the human body during use. Besides, the resin composition presented in the present invention has a good processability. It can be fabricated into film, tubes and components via blowing, extruding, calendaring, etc. Also, the film, tubes and components fabricated can be welded and assembled by using laser welding, thermal welding or the like.

DETAILED DESCRIPTION OF THE PREFERRED EMBODIMENTS

The invention provides a resin composition consisting of a functionalized polypropylene (PP) and a functionalized styrenic thermoplastic elastomer (TPS) with respect to the prior art.

The functionalized PP is a PP grafted with N-vinyl pyrrolidone (NVP) and glycidyl methacrylate (GMA), and the functionalized TPS is a TPS grafted with acrylamide or methacrylamide.

According to the present invention, the functionalized PP and the functionalized TPS are preferably used in a ratio of 1:2-1:10 by weight. More preferably, the functionalized PP and the functionalized TPS are used in a ratio of 1:2-1:7 by weight. Most preferably, the functionalized PP and the functionalized TPS are used in a ratio of 1:2-1:5 by weight.

According to the present invention, the functionalized PP is a PP grafted with NVP and GMA. For the better performances of the resin composition, the PP is a copolymer of propylene with ethylene. The content of ethylene in the PP is preferably 3%-30% by weight. More preferably, the content of ethylene in the PP is 4%-15% by weight. The melt flow rate of the PP is preferably 0.5 g/10 min-20 g/10 min (ASTM D1238, 190° C. under a load of 2.16 kg.). More preferably, the melt flow rate of the PP is 1 g/10 min-10 g/10 min (ASTM D1238, 190° C. under a load of 2.16 kg.)

NVP can improve blood compatibility of the resin composition. In the present invention, the amount of NVP is preferably 1%-15% by weight of the PP. More preferably, the amount of NVP is 2%-10% by weight of the PP.

GMA has an epoxy group which can react with other groups to form a slightly cross-linking structure, thus increasing physical performance of the resin composition. The amount of GMA is preferably 2%-10% by weight of the PP. More preferably, the amount of GMA is 3%-8% by weight of the PP.

The present invention has no special restriction on the sources of the PP. Preferably, preparation of the functionalized PP proceeds as follows: PP is subjected to pre-irradiation, and then the pre-irradiated PP, NVP and GMA are subjected to melt blending to obtain the functionalized PP.

PP can produce free radicals upon irradiation which initiate the followed grafting reaction. In the present invention, PP is preferably subjected to an electron beam or γ-ray irradiation, the preferred irradiation dose is 2 kGy-30 kGy. Specifically, as for electron beam irradiation, electron accelerator is preferably used as the irradiation source, and the preferred irradiation dose is 2 kGy -30 kGy. In the case of γ-ray irradiation, $Co^{60}$ is preferably used as the irradiation source, and the preferred irradiation dose is 2 kGy-20 kGy.

The PP with free radicals, NVP and GMA are subjected to melt blending. NVP and GMA are grafted onto the PP backbone to obtain the functionalized PP. NVP and GMA melt co-grafting can improve the grafting degree of GMA onto PP backbone, and increase the content of epoxy group on the PP backbone. Thus, the performance of the functionalized PP and the resin composition is improved.

In present process of the present invention, extruder, internal mixer, etc. can be used in melt blending. Preferably, a reactive twin-screw extruder is applied. In the case of using a reactive twin-screw extruder, the operating parameters are as follows: the preferred temperature of the extruder is set to be 140° C.-210° C., the preferred temperature of ram head is set to be 160° C.-200° C., and the preferred residence time in the extruder is 1 min-5 min.

In order to improve the grafting reaction, the pre-irradiated PP, NVP and GMA are preferably mixed in a high-speed mixer for 2 min-8 min in advance.

In present process of the present invention, the functionalized PP obtained by melt blending is subjected to granulating, dissolution-precipitation purification, drying, etc. to obtain the dry and pure functionalized PP.

According to the present invention, the functionalized TPS is a TPS grafted with acrylamide or methacrylamide.

The present invention has no special restriction on the TPS. The TPS includes, but is not limited to styrene-b-(ethylene-co-butylene)-b-styrene (SEBS), styrene-b-(ethylene-propylene)-b-styrene (SEIS) or styrene-b-(ethylene-butylene-propylene)-b-styrene (SEBIS). The content of styrene in the TPS is preferably 3%-60% by weight. More preferably, the content of styrene in the TPS is 10%-40% by weight. The melt flow rate of the TPS is preferably 0.5 g/10 min-20 g/10 min (ASTM D1238, 200° C. under a load of 5.0 kg.). More preferably, the melt flow rate of the TPS is 3 g/10 min-10 g/10 min (ASTM D1238, 200° C. under a load of 5.0 kg).

Acrylamide or methacrylamide has the function of reacting with epoxy group on the functionalized PP. The amount of acrylamide or methacrylamide is preferably 1%-10% by weight of the TPS. More preferably, the amount of acrylamide or methacrylamide is preferably 2%-6% by weight of the TPS. Specifically, the preferred amount of acrylamide is 1%-5° A) by weight of the TPS, and the preferred amount of methacrylamide is 2%-6% by weight of the TPS;

The present invention has no special restriction on the sources of the TPS grafted with acrylamide or methacrylamide. Preferably, preparation of the functionalized TPS proceeds as follows: TPS is subjected to pre-irradiation; the pre-irradiated TPS, acrylamide or methacrylamide are subjected to melt blending to obtain the functionalized TPS.

TPS can produce free radicals upon irradiation which can initiate the followed grafting reaction. In the present invention, TPS is preferably subjected to an electron beam or γ-ray irradiation, the preferred irradiation dose is 2 kGy-50 kGy. Specifically, as for electron beam irradiation, electron accelerator is preferably used as irradiation source, the preferred irradiation dose is 2 kGy-50 kGy. In the case of γ-ray irradiation, $Co^{60}$ is preferably used as irradiation source, and the preferred irradiation dose is 2 kGy-30 kGy.

The TPS with free radicals, acrylamide or methacrylamide are subjected to melt blending, thus acrylamide or methacrylamide are grafted onto the TPS backbone to obtain the functionalized TPS.

In present process of the present invention, extruder, internal mixer, etc. can be used in melt blending. Preferably, a reactive twin-screw extruder is applied. In the case of using a reactive twin-screw extruder, the operating parameters are as follows: the preferred temperature of the extruder is set to be 140° C.-230° C., the preferred temperature of ram head is set to be 180° C.-220° C., and the preferred residence time in the extruder is 1 min-5 min.

In order to benefit the grafting reaction, the pre-irradiated TPS, acrylamide or methacrylamide is preferably mixed in a high-speed mixer for 2 min-8 min in advance.

In present process of the present invention, the functionalized TPS obtained by melt blending is subjected to granulating, dissolution-precipitation purification, drying, etc. to obtain the dry and pure functionalized TPS.

The resin composition is prepared via mixing the functionalized PP and the functionalized TPS. The mixing is conducted in accordance with the public methods known to the technical staff in this field. For example, firstly, it can be uniformly mixed by using a high-speed kneader, ribbon mixer, V-mixer, high-speed mixer, etc. Then it is melt blended via an internal mixer, single-screw extruder, twin-screw extruder, etc. Preferably, the functionalized PP and the functionalized TPS are mixed in a high-speed mixer for 2 min-5 min to obtain uniform mixture. Then the uniform mixture is subjected to melt blending in a reactive twin-screw extruder. In the case of using a reactive twin-screw extruder, the operating parameters are as follows: the preferred temperature of the extruder is set to be 140° C.-240° C., the preferred temperature of ram head is set to be 170° C.-220° C., and the preferred residence time in the extruder is 1 min-5 min.

A reaction between the epoxy group on the functionalized PP and the acrylamide or methacrylamide on the functionalized TPS occurs during melt blending process to form a slightly cross-linking structure. Thus, the physical performance of the resin composition is superior to that of alloys produced by physical blending.

In present process of the present invention, the resin composition is subjected to granulating, dissolution-precipitation purification, drying, etc. Thus, a usable polymer material without further treating process is obtained.

The resin composition presented in the invention has a good processability. It can be fabricated into film, tube and component via blowing, extruding, calendaring, etc. Also, the film, tubes and components fabricated can be welded and assembled by using laser welding, thermal welding or the like. The resin composition provided in the present invention has a wider application which includes, but is not limited to, fabricating various liquid storage apparatuses, especially, blood storage and transfusion apparatuses such as blood bags, blood transfusion and collection apparatuses as well as components contacting with blood.

The present invention provides a resin composition consisting of a functionalized polypropylene (PP) and a functionalized styrenic thermoplastic elastomer (TPS) with respect to the existed technique. The functionalized PP is a PP grafted with N-vinyl pyrrolidone (NVP) and glycidyl methacrylate (GMA). The functionalized TPS is a TPS grafted with acrylamide or methacrylamide. The functionalized PP and the functionalized TPS are subjected to melt blending to obtain the resin composition with slight cross-linking structure due to the reaction between GMA and acrylamide or methacrylamide, therefore the resin composition presents good physical properties such as transparency, elongation at break, gas permeation, etc.

The resin composition provided in the present invention is introduced with NVP, therefore blood compatibility and blood storage performance of the resin composition are improved. The resin composition without additional plasticizer or other small molecular organic compounds can be utilized in blood bags, blood transfusion and collection apparatuses, etc. Thus, it does not release small molecular substances which are of potential harm to human body during use.

To further understand the present invention, the resin composition provided is described in detail by referring to the following EXAMPLES. However, the scope of the invention is not limited to these EXAMPLES.

The component code, type, source and technical parameter of the PP and TPS used in the EXAMPLES are specified in Table 1.

EXAMPLE 1

50 Kg PP powder with a component code of A1 was subjected to an electron beam irradiation with an irradiation dose of 8 kGy. Then the pre-irradiated PP, 3.3 Kg commercially available NVP and 3.3 Kg commercially available GMA were mixed in a high-speed mixer for 4 minutes to obtain a uniform mixture. The obtained mixture proceeded with melt co-grafting reaction in a reactive twin-screw extruder, the residence time of the obtained mixture in the extruder was set to be 2-3 minutes, wherein the screw had a diameter of 40 mm and the ratio of length to diameter was 36. The temperature of the extruder was set to be 160° C.-200° C., and the temperature of ram head was set to be 185° C. The extruded material was subjected to granulating, dissolution-precipitation purification and drying to obtain the functionalized PP.

The performance of the functionalized PP was examined, and the testing results were listed in Table 2. Table 2 presented the performance of the functionalized PP prepared in the Examples of the present invention.

EXAMPLE 2

50 Kg PP powder with a component code of A1 was subjected to a γ-ray irradiation with an irradiation dose of 3 kGy. Then the pre-irradiated PP, 2.5 Kg commercially available NVP and 2.5 Kg commercially available GMA were mixed in a high-speed mixer for 3.5 minutes to obtain a uniform mixture. The obtained mixture proceeded with melt co-grafting reaction in a reactive twin-screw extruder, the residence time of the obtained mixture in the extruder was set to be 2-3 minutes, wherein the screw had a diameter of 40 mm and the ratio of length to diameter was 36. The temperature of the extruder was set to be 160° C.-200° C., the temperature of ram head was set to be 180° C. The extruded material was subjected to granulating, dissolution-precipitation purification and drying to obtain the functionalized PP.

The performance of the functionalized PP was examined, and the testing results were listed in Table 2. Table 2 presented the performance of the functionalized PP prepared in the Examples of the present invention.

TABLE 1

Technical parameters of PP and TPS

| component code | Commercial name | Commercial supplier | Comonomers and weight contents thereof | MFR* (g/10 min) |
|---|---|---|---|---|
| A1 | PP | Polymer Corporation, Singapore | Ethylene: 8% Propylene: the rest | 2.0 |
| A2 | PP | Chisso Corporation, Japan | Ethylene: 6% Propylene: the rest | 7.0 |
| B1 | SEIS | Kurary Corporation, Japan | Styrene, 20% Elastomer monomers: the rest | 3.0 |
| B2 | SEIS | Kurary Corporation, Japan | Styrene, 12% Elastomer monomers: the rest | 5.7 |
| B3 | SEBS | Kraton Corporation, USA | Styrene, 31% Elastomer monomers: the rest | 4.0 |
| B4 | SEBS | Kraton Corporation, USA | Styrene, 13% Elastomer monomers: the rest | 8.0 |
| B5 | SEBIS | Petrochemical Corporation, China | Styrene, 30% Elastomer monomers: the rest | 3.2 |
| B6 | SEBIS | Petrochemical Corporation, China | Styrene, 13% Elastomer monomers: the rest | 6.3 |

*MFR, melt flow rate, which was measured in conformity with ASTM D1238.
Testing condition for A1, A2: 190° C. under a load of 2.16 kg.
Testing condition for B1-B6: 200° C. under a load of 5.0 kg;

EXAMPLE 3

50 Kg PP powder with a component code of A2 was subjected to an electron beam irradiation with an irradiation dose of 6 kGy. Then the pre-irradiated PP, 3.2 Kg commercially available NVP and 3.2 Kg commercially available GMA were mixed in a high-speed mixer for 4 minutes to obtain a uniform mixture. The obtained mixture proceeded with melt co-grafting reaction in a reactive twin-screw extruder, the residence time of the obtained mixture in the extruder was set to be 2-3 minutes, wherein the screw had a diameter of 40 mm and the ratio of length to diameter was 36. The temperature of the extruder was set to be 160° C.-200° C., the temperature of ram head was set to be 185° C. The extruded material was subjected to granulating, dissolution-precipitation purification and drying to obtain the functionalized PP.

The performance of the functionalized PP was examined, and the testing results were listed in Table 2. Table 2 presented the performance of the functionalized PP prepared in the Examples of the present invention.

EXAMPLE 4

50 Kg PP powder with a component code of A2 was subjected to a γ-ray irradiation with an irradiation dose of 4 kGy. Then the pre-irradiated PP, 3.0 Kg commercially available NVP and 3.0 Kg commercially available GMA were mixed in a high-speed mixer for 4 minutes to obtain a uniform mixture. The obtained mixture proceeded with melt co-grafting reaction in a reactive twin-screw extruder, the residence time of the obtained mixture in the extruder was set to be 2-3 minutes, wherein the screw had a diameter of 40 mm and the ratio of length to diameter was 36. The temperature of the extruder was set to be 160° C.-200° C., the temperature of ram head was set to be 185° C. The extruded material was subjected to granulating, dissolution-precipitation purification and drying to obtain the functionalized PP.

The performance of the functionalized PP was examined, and the testing results were listed in Table 2. Table 2 presented the performance of the functionalized PP prepared in the Examples of the present invention.

TABLE 2

Performances of the functionalized PP prepared in the Examples

| EXAMPLE | Grafting degree of GMA (wt %) | Grafting degree of NVP (wt %) | MFR* (g/10 min) | Tensile strength (MPa) | Elongation at break (%) |
|---|---|---|---|---|---|
| 1 | 3.8 | 4.2 | 4.2 | 27.5 | 660 |
| 2 | 2.8 | 3.1 | 5.6 | 26.8 | 580 |
| 3 | 3.3 | 3.7 | 10.3 | 23.6 | 540 |
| 4 | 2.9 | 3.0 | 11.9 | 22.4 | 560 |
| Testing standard | Infrared spectroscopy | Infrared spectroscopy | ASTM D1238 | GB1040 | GB1040 |

*MFR, which was measured in conformity with ASTM D1238.
Testing condition: 190° C. under a load of 2.16 kg.

EXAMPLE 5

50 Kg SEIS powder with a component code of B1 was subjected to a γ-ray irradiation with an irradiation dose of 8 kGy. Then the pre-irradiated SEIS and 2.2 Kg methacrylamide were mixed in a high-speed mixer for 4 minutes to obtain a uniform mixture. The obtained mixture proceeded with melt co-grafting reaction in a reactive twin-screw extruder, the residence time of the obtained mixture in the extruder was set to be 1 min-3 min, wherein the screw had a diameter of 40 mm and the ratio of length to diameter was 36. The temperature of the extruder was set to be 160° C.-220° C., the temperature of ram head was set to be 200° C. The extruded material was subjected to granulating, dissolution-precipitation purification and drying to obtain the functionalized TPS.

The performance of the functionalized TPS was examined, and the testing results were listed in Table 3. Table 3 presented the performance of the functionalized PP prepared in the Examples of the present invention.

EXAMPLE 6

50 Kg SEIS powder with a component code of B2 was subjected to an electron beam irradiation with an irradiation dose of 10 kGy. Then the pre-irradiated SEIS and 2.8 Kg commercially available acrylamide were mixed in a high-speed mixer for 4 minutes to obtain a uniform mixture. The obtained mixture proceeded with melt co-grafting reaction in a reactive twin-screw extruder, the residence time of the obtained mixture in the extruder was set to be 1 min-3 min, wherein the screw had a diameter of 40 mm and the ratio of length to diameter was 36. The temperature of the extruder was set to be 160° C.-220° C., the temperature of ram head was set to be 200° C. The extruded material was subjected to granulating, dissolution-precipitation purification and drying to obtain the functionalized TPS.

The performance of the functionalized TPS was examined, and the testing results were listed in Table 3. Table 3 presented the performance of the functionalized PP prepared in the Examples of the present invention.

EXAMPLE 7

50 Kg SEBS powder with a component code of B3 was subjected to an electron beam irradiation with an irradiation dose of 15 kGy. Then the pre-irradiated SEBS and 2.5 Kg commercially available methacrylamide were mixed in a high-speed mixer for 4 minutes to obtain a uniform mixture. The obtained mixture proceeded with melt co-grafting reaction in a reactive twin-screw extruder, the residence time of the obtained mixture in the extruder was set to be 1 min-3 min, wherein the screw had a diameter of 40 mm and the ratio of length to diameter was 36. The temperature of the extruder was set to be 160° C.-220° C., the temperature of ram head was set to be 200° C. The extruded material was subjected to granulating, dissolution-precipitation purification and drying to obtain the functionalized TPS.

The performance of the functionalized TPS was examined, and the testing results were listed in Table 3. Table 3 presented the performance of the functionalized PP prepared in the Examples of the present invention.

EXAMPLE 8

50 Kg SEBS powder with a component code of B4 was subjected to a γ-ray irradiation with an irradiation dose of 8 kGy. Then the pre-irradiated SEBS and 2.1 Kg commercially available acrylamide were mixed in a high-speed mixer for 4 minutes to obtain a uniform mixture. The obtained mixture proceeded with melt co-grafting reaction in a twin-screw extruder, the residence time of the obtained mixture in the extruder was set to be 1 min-3 min, wherein the screw had a diameter of 40 mm and the ratio of length to diameter was 36. The temperature of the extruder was set to be 160 T-220° C., the temperature of ram head was set to be 190° C. The extruded material was subjected to granulating, dissolution-precipitation purification and drying to obtain the functionalized TPS.

The performance of the functionalized TPS was examined, and the testing results were listed in Table 3. Table 3 presented the performance of the functionalized PP prepared in the Examples of the present invention.

EXAMPLE 9

50 Kg SEBIS powder with a component code of B5 was subjected to a γ-ray irradiation with an irradiation dose of 12 kGy. Then the pre-irradiated SEBIS and 2.4 Kg commercially available methacrylamide were mixed in a high-speed mixer for 4 minutes to obtain a uniform mixture. The obtained mixture proceeded with melt co-grafting reaction in a twin-screw extruder, the residence time of the obtained mixture in the extruder was set to be 1 min-3 min, wherein the screw had a diameter of 40 mm and the ratio of length to diameter was 36. The temperature of the extruder was set to be 160° C.-220° C., the temperature of ram head was set to be 200° C. The extruded material was subjected to granulating, dissolution-precipitation purification and drying to obtain the functionalized TPS.

The performance of the functionalized TPS was examined, and the testing results were listed in Table 3. Table 3 presented the performance of the functionalized PP prepared in the Examples of the present invention.

EXAMPLE 10

50 Kg SEBIS powder with a component code of B6 was subjected to an electron beam irradiation with an irradiation dose of 20 kGy. Then the pre-irradiated SEWS and 2.2 Kg commercially available acrylamide were mixed in a high-speed mixer for 4 min to obtain a uniform mixture. The obtained mixture proceeded with melt co-grafting reaction in a twin-screw extruder, the residence time of the obtained mixture in the extruder was set to be 1 min-3 min, wherein the screw had a diameter of 40 mm and the ratio of length to diameter was 36. The temperature of the extruder was set to be 160° C.-220° C., the temperature of ram head was set to be 200° C. The extruded material was subjected to granulating, dissolution-precipitation purification and drying to obtain the functionalized TPS.

The performance of the functionalized TPS was examined, and the testing results were listed in Table 3. Table 3 presented the performance of the functionalized PP prepared in the Examples of the present invention.

TABLE 3

Performances of the TPS prepared in the Examples

| EXAMPLE | Grafting degree (wt %) | MFR* (g/10 min) | Tensile strength (MPa) | Elongation at break (%) |
|---|---|---|---|---|
| 5 | 1.6 | 3.8 | 18.2 | 680 |
| 6 | 2.1 | 6.9 | 10.4 | 750 |
| 7 | 2.3 | 5.8 | 31.0 | 500 |
| 8 | 1.9 | 10.2 | 11.8 | 770 |
| 9 | 1.4 | 6.4 | 28.2 | 620 |
| 10 | 1.8 | 7.2 | 9.9 | 690 |
| Testing standard | Infrared spectroscopy | ASTM D1238 | GB1040 | GB1040 |

*MFR, which was measured in conformity with ASTM D1238.
Testing condition: 200° C. under a load of 5.0 kg.

EXAMPLE 11

10 Kg of the functionalized PP prepared in Example 1 and 35 Kg of the functionalized TPS prepared in Example 5 were mixed in a high-speed mixer for 2.5 minutes to obtain a uniform mixture. Then the mixture proceeded with melt reactive extrusion in a reactive twin-screw extruder, the residence time of the obtained mixture in the extruder was set to be 1 min-3 min, wherein the screw had a diameter of 40 mm and the ratio of length to diameter ratio was 36. The temperature of the extruder was set to be 160° C.-210° C., and the temperature of ram head was set to be 200° C. The mixture was subjected to granulating, and drying to obtain the resin composition consisting of the functionalized PP and the functionalized TPS.

The performance of the resin composition was examined, and the testing results were listed in Table 4. Table 4 presented performances of the resin composition prepared in the Examples of the present invention and Comparative Examples.

The resin composition was fabricated into samples with an effective area of 50 cm$^2$ and a thickness of 0.45 mm.

Oxygen permeation was measured according to ASTM D3985. The testing apparatus used was MOCON OX-TRAN MODEL 2/21 gas permeation tester from MOCON Corporation, USA. The testing time was 48 h and the oxygen concentration was 10%. Oxygen permeation of the samples was listed in Table 5. Table 5 provided gas permeation of the resin composition prepared in the Examples of the present invention and Comparative Examples.

Carbon dioxide permeation was tested according to GB/T 1038-2000. The testing apparatus used was VAC-V1 gas permeation tester from Jinan Languang M&E Technology Co., Ltd. Carbon dioxide permeation of the samples was listed in Table 5. Table 5 presented gas permeation of the resin composition prepared in the Examples of the present invention and Comparative Examples.

EXAMPLE 12

10 Kg of the functionalized PP prepared in Example 2 and 30 Kg of the functionalized TPS prepared in Example 7 were mixed in a high-speed mixer for 2.5 min to obtain a uniform mixture. Then the mixture proceeded with melt reactive extrusion in a reactive twin-screw extruder, the residence time of the obtained mixture in the extruder was set to be 1 min-3 min, wherein the screw had a diameter of 40 mm and the ratio of length to diameter ratio was 36, the temperature of the extruder was set to be 160° C.-210° C., and the temperature of ram head was set to be 190° C. The mixture was subjected to granulating, and drying to obtain the resin composition consisting of the functionalized PP and the functionalized TPS.

The performance of the resin composition was examined, and the testing results were listed in Table 4. Table 4 presented performances of the resin composition prepared in the Examples of the present invention and Comparative Examples.

The resin composition was fabricated into samples with an effective area of 50 cm$^2$ and a thickness of 0.45 mm.

Oxygen permeation was measured according to ASTM D3985. The testing apparatus used was MOCON OX-TRAN MODEL 2/21 gas permeation tester from MOCON Corporation, USA. The testing time was 48 h and the oxygen concentration was 10%. Oxygen permeation of the samples was listed in Table 5. Table 5 presented gas permeation of the resin composition prepared in the Examples of the present invention and Comparative Examples.

Carbon dioxide permeation was tested according to GB/T 1038-2000. The testing apparatus used was VAC-V1 gas permeation tester from Jinan Languang M&E Technology Co., Ltd. Carbon dioxide permeation of the samples was listed in Table 5. Table 5 presented gas permeation of the resin composition prepared in the Examples of the present invention and Comparative Examples.

EXAMPLE 13

10 Kg of the functionalized PP prepared in Example 1 and 40 Kg of the functionalized TPS prepared in Example 9 were mixed in a high-speed mixer for 2.5 min to obtain a uniform mixture. Then the mixture proceeded with melt reactive extrusion in a reactive twin-screw extruder, the residence time of the obtained mixture in the extruder was set to be 1 min-3 min, wherein the screw had a diameter of 40 mm and the ratio of length to diameter ratio was 36, the temperature of the extruder was set to be 160° C.-210° C., and the temperature of ram head was set to be 190° C. The mixture was subjected to granulating, and drying to obtain the resin composition consisting of the functionalized PP and the functionalized TPS.

The performance of the resin composition was examined, and the testing results were listed in Table 4. Table 4 presented performances of the resin composition prepared in the Examples of the present invention and Comparative Examples.

The resin composition was fabricated into samples with an effective area of 50 cm$^2$ and a thickness of 0.45 mm.

Oxygen permeation was measured according to ASTM D3985. The testing apparatus used was MOCON OX-TRAN MODEL 2/21 gas permeation tester from MOCON Corporation, USA. The testing time was 48 h and the oxygen concentration was 10%. Oxygen permeation of the samples was listed in Table 5. Table 5 presented gas permeation of the resin composition prepared in the Examples of the present invention and Comparative Examples.

Carbon dioxide permeation was tested according to GB/T 1038-2000. The testing apparatus used was VAC-V1 gas permeation tester from Jinan Languang M&E Technology Co., Ltd. Carbon dioxide permeation of the samples was listed in Table 5. Table 5 presented gas permeation of the resin composition prepared in the Examples of the present invention and Comparative Examples.

EXAMPLE 14

10 Kg of the functionalized PP prepared in Example 2 and 33 Kg of the functionalized TPS prepared in Example 10 were mixed in a high-speed mixer for 2.5 min to obtain a uniform mixture. Then the mixture proceeded with melt reactive extrusion in a reactive twin-screw extruder, the residence time of the obtained mixture in the extruder was set to be 1 min-3 min, wherein the screw had a diameter of 40 mm and the ratio of length to diameter ratio was 36, the temperature of the extruder was set to be 160° C.-210° C., and the temperature of ram head was set to be 190° C. The mixture was subjected to granulating, and drying to obtain the resin composition consisting of the functionalized PP and the functionalized TPS.

The performance of the resin composition was examined, and the testing results were listed in Table 4. Table 4 presented performances of the resin composition prepared in the Examples of the present invention and Comparative Examples.

The resin composition was fabricated into samples with an effective area of 50 cm$^2$ and a thickness of 0.45 mm.

Oxygen permeation was measured according to ASTM D3985. The testing apparatus used was MOCON OX-TRAN MODEL 2/21 gas permeation tester from MOCON Corporation, USA. The testing time was 48 h and the oxygen concentration was 10%. Oxygen permeation of the samples was listed in Table 5. Table 5 presented the gas permeation of the resin composition prepared in the Examples of the present invention and Comparative Examples.

Carbon dioxide permeation was tested according to GB/T 1038-2000. The testing apparatus used was VAC-V1 gas permeation tester from Jinan Languang M&E Technology Co., Ltd. Carbon dioxide permeation of the samples was listed in Table 5. Table 5 presented gas permeation of the resin composition prepared in the Examples of the present invention and Comparative Examples.

EXAMPLE 15

10 Kg of the functionalized PP prepared in Example 3 and 35 Kg of the functionalized TPS prepared in Example 5 were mixed in a high-speed mixer for 2.5 min to obtain a uniform mixture. Then the mixture proceeded with melt reactive extrusion in a reactive twin-screw extruder, the residence time of the obtained mixture in the extruder was set to be 1 min-3 min, wherein the screw had a diameter of 40 mm and the ratio of length to diameter ratio was 36, the temperature of the extruder was set to be 160° C.-210° C., and the temperature of ram head was set to be 190° C. The mixture was subjected to granulating, and drying to obtain the resin composition consisting of the functionalized PP and the functionalized TPS.

The performance of the resin composition was examined, and the testing results were listed in Table 4. Table 4 presented performances of the resin composition prepared in the Examples of the present invention and Comparative Examples.

The resin composition was fabricated into samples with an effective area of 50 cm$^2$ and a thickness of 0.45 mm.

Oxygen permeation was measured according to ASTM D3985. The testing apparatus used was MOCON OX-TRAN MODEL 2/21 gas permeation tester from MOCON Corporation, USA. The testing time was 48 h and the oxygen concentration was 10%. Oxygen permeation of the samples was listed in Table 5. Table 5 presented gas permeation of the resin composition prepared in the Examples of the present invention and Comparative Examples.

Carbon dioxide permeation was tested according to GB/T 1038-2000. The testing apparatus used was VAC-V1 gas permeation tester from Jinan Languang M&E Technology Co., Ltd. Carbon dioxide permeation of the samples was listed in Table 5. Table 5 presented gas permeation of the resin composition prepared in the Examples of the present invention and Comparative Examples.

EXAMPLE 16

10 Kg of the functionalized PP prepared in Example 3 and 30 Kg of the functionalized TPS prepared in Example 7 were mixed in a high-speed mixer for 2.5 min to obtain a uniform mixture. Then the mixture proceeded with melt reactive extrusion in a reactive twin-screw extruder, the residence time of the obtained mixture in the extruder was set to be 1 min-3 min, wherein the screw had a diameter of 40 mm and the ratio of length to diameter ratio was 36, the temperature is of the extruder was set to be 160° C.-210° C., and the temperature of ram head was set to be 190° C. The mixture was subjected to granulating, and drying to obtain the resin composition consisting of the functionalized PP and the functionalized TPS.

The performance of the resin composition was examined, and the testing results were listed in Table 4. Table 4 presented performances of the resin composition prepared in the Examples of the present invention and Comparative Examples.

The resin composition was fabricated into samples with an effective area of 50 cm$^2$ and a thickness of 0.45 mm.

Oxygen permeation was measured according to ASTM D3985. The testing apparatus used was MOCON OX-TRAN MODEL 2/21 gas permeation tester from MOCON Corporation, USA. The testing time was 48 h and the oxygen concentration was 10%. Oxygen permeation of the samples was listed in Table 5. Table 5 presented gas permeation of the resin composition prepared in the Examples of the present invention and Comparative Examples.

Carbon dioxide permeation was tested according to GB/T 1038-2000. The testing apparatus used was VAC-V1 gas permeation tester from Jinan Languang M&E Technology Co., Ltd. Carbon dioxide permeation of the samples was listed in Table 5. Table 5 presented gas permeation of the resin composition prepared in the Examples of the present invention and Comparative Examples.

EXAMPLE 17

10 Kg of the functionalized PP prepared in Example 3 and 33 Kg of the functionalized TPS prepared in Example 8 were mixed in a high-speed mixer for 2.5 min to obtain a uniform mixture. Then the mixture proceeded with melt reactive extrusion in a reactive twin-screw extruder, the residence time of the obtained mixture in the extruder was set to be 1 min-3 min, wherein the screw had a diameter of 40 mm and the ratio of length to diameter ratio was 36, the temperature of the extruder was set to be 160° C.-210° C., and the temperature of ram head was set to be 190° C. The mixture was subjected to granulating, and drying to obtain the resin composition consisting of the functionalized PP and the functionalized TPS.

The performance of the resin composition was examined, and the testing results were listed in Table 4. Table 4 presented performances of the resin composition prepared in the Examples of the present invention and Comparative Examples.

The resin composition was fabricated into samples with an effective area of 50 cm$^2$ and a thickness of 0.45 mm.

Oxygen permeation was measured according to ASTM D3985. The testing apparatus used was MOCON OX-TRAN MODEL 2/21 gas permeation tester from MOCON Corporation, USA. The testing time was 48 h and the oxygen concentration was 10%. Oxygen permeation of the samples was listed in Table 5. Table 5 presented gas permeation of the resin composition prepared in the Examples of the present invention and Comparative Examples.

Carbon dioxide permeation was tested according to GB/T 1038-2000. The testing apparatus used was VAC-V1 gas permeation tester from Jinan Languang M&E Technology Co., Ltd. Carbon dioxide permeation of the samples was listed in Table 5. Table 5 presented gas permeation of the resin composition prepared in the Examples of the present invention and Comparative Examples.

EXAMPLE 18

10 Kg of the functionalized PP prepared in Example 4 and 35 Kg of the functionalized TPS prepared in Example 7 were mixed in a high-speed mixer for 2.5 min to obtain a uniform mixture. Then the mixture proceeded with melt reactive extrusion in a reactive twin-screw extruder, the residence time of the obtained mixture in the extruder was set to be 1 min-3 min, wherein the screw had a diameter of 40 mm and the ratio of length to diameter ratio was 36, the temperature of the extruder was set to be 160° C.-210° C., and the temperature of ram head was set to be 190° C. The mixture was subjected to granulating, and drying to obtain the resin composition consisting of the functionalized PP and the functionalized TPS.

The performance of the resin composition was examined, and the testing results were listed in Table 4. Table 4 presented performances of the resin composition prepared in the Examples of the present invention and Comparative Examples.

The resin composition was fabricated into samples with an effective area of 50 cm$^2$ and a thickness of 0.45 mm.

Oxygen permeation was measured according to ASTM D3985. The testing apparatus used was MOCON OX-TRAN MODEL 2/21 gas permeation tester from MOCON Corporation, USA. The testing time was 48 h and the oxygen concentration was 10%. Oxygen permeation of the samples was listed in Table 5. Table 5 presented gas permeation of the resin composition prepared in the Examples of the present invention and Comparative Examples.

Carbon dioxide permeation was tested according to GB/T 1038-2000. The testing apparatus used was VAC-V1 gas permeation tester from Jinan Languang M&E Technology Co., Ltd. Carbon dioxide permeation of the samples was listed in Table 5. Table 5 presented gas permeation of the resin composition prepared in the Examples of the present invention and Comparative Examples.

EXAMPLE 19

10 Kg of the functionalized PP prepared in Example 4 and 35 Kg of the functionalized TPS prepared in Example 10 were mixed in a high-speed mixer for 2.5 min to obtain a uniform mixture. Then the mixture proceeded with melt reactive extrusion in a reactive twin-screw extruder, the residence time of the obtained mixture in the extruder was set to be 1 min-3 min, wherein the screw had a diameter of 40 mm and the ratio of length to diameter ratio was 36, the temperature of the extruder was set to be 160° C.-210° C., and the temperature of ram head was set to be 190° C. The mixture was subjected to granulating, and drying to obtain the resin composition comprising of the functionalized PP and the functionalized TPS.

The performance of the resin composition was examined, and the testing results were listed in Table 4. Table 4 presented performances of the resin composition prepared in the Examples of the present invention and Comparative Examples.

The resin composition was fabricated into samples with an effective area of 50 cm$^2$ and a thickness of 0.45 mm.

Oxygen permeation was measured according to ASTM D3985. The testing apparatus used was MOCON OX-TRAN MODEL 2/21 gas permeation tester from MOCON Corporation, USA. The testing time was 48 h and the oxygen concentration was 10%. Oxygen permeation of the samples was listed in Table 5. Table 5 presented gas permeation of the resin composition prepared in the Examples of the present invention and Comparative Examples.

Carbon dioxide permeation was tested according to GB/T 1038-2000. The testing apparatus used was VAC-V1 gas permeation tester from Jinan Languang M&E Technology Co., Ltd. Carbon dioxide permeation of the samples was listed in Table 5. Table 5 presented gas permeation of the resin composition prepared in the Examples of the present invention and Comparative Examples.

EXAMPLE 20

Five blood bags were fabricated by using the resin composition prepared in Example 13. The blood bags were filled with fresh human whole blood, and were stored at 5° C. for 35 days. The blood storage performance of the blood bags was examined, and the testing results were listed in Table 6. Table 6 presented blood storage performance of the blood bags made of the resin composition of the Examples in the present invention and Comparative Examples.

EXAMPLE 21

Five blood bags were fabricated by using the resin composition prepared in Example 16. The blood bags were filled with fresh human whole blood, and were stored at 5° C. for 35 days. The blood storage performance of the blood bags was examined, and the testing results were listed in Table 6. Table 6 presented blood storage performance of the blood bags made of the resin composition of the Examples in the present invention and Comparative Examples.

EXAMPLE 22

Five blood bags were fabricated by using the resin composition prepared in Example 19. The blood bags were filled with fresh human whole blood, and were stored at 5° C. for 35 days. The blood storage performance of the blood bags was examined, and the testing results were listed in Table 6. Table 6 presented blood storage performance of the blood bags made of the resin composition of the Examples in the present invention and Comparative Examples.

COMPARATIVE EXAMPLE 1

The PVC material for erythrocyte blood bags from Shandong Weigao Group Medical Polymer Corporation Limited was chosen as Comparative Example. The PVC material was examined, and the testing results were listed in Table 4. Table 4 presented performance of the resin composition prepared in the Examples of the present invention and Comparative Examples.

The PVC material was fabricated into samples with an effective area of 50 $cm^2$ and a thickness of 0.45 mm.

Oxygen permeation of the PVC sample was measured according to ASTM D3985. The testing apparatus used was MOCON OX-TRAN MODEL 2/21 gas permeation tester from MOCON Corporation, USA. The testing time was 48 h and the oxygen concentration was 10%. Oxygen permeation of the samples was listed in Table 5. Table 5 presented gas permeation of the resin composition prepared in the Examples of the present invention and Comparative Examples.

Carbon dioxide permeation of the PVC sample was tested according to GB/T 1038-2000. The testing apparatus used was VAC-V1 gas permeation tester from Jinan Languang MSE Technology Co., Ltd. Carbon dioxide permeation of the samples was listed in Table 5. Table 5 presented gas permeation of the resin composition prepared in the Examples of the present invention and Comparative Examples.

COMPARATIVE EXAMPLE 2

The PVC material for blood platelet bags from Shandong Weigao Group Medical Polymer Corporation Limited was chosen as Comparative Example. The PVC material was examined, and the testing results were listed in Table 4. Table 4 presented performance of the resin composition prepared in the Examples of the present invention and Comparative Examples.

TABLE 4

Performances of the resin compositions prepared in the Examples of the present invention and Comparative Examples

| Samples | Transparency (%) | Haze (%) | Rigidity (shore A) | MFR* (g/10 min) | Tensile strength (MPa) | Elongation at break (%) |
|---|---|---|---|---|---|---|
| Example 11 | 52.2 | 38.0 | 81 | 2.0 | 20.8 | 620 |
| Example 12 | 54.0 | 25.1 | 77 | 1.9 | 20.6 | 590 |
| Example 13 | 57.0 | 22.1 | 79 | 2.2 | 19.6 | 770 |
| Example 14 | 56.4 | 28.4 | 79 | 2.8 | 17.9 | 810 |
| Example 15 | 58.2 | 19.0 | 78 | 2.3 | 17.6 | 830 |
| Example 16 | 59.0 | 17.1 | 78 | 1.8 | 22.6 | 560 |
| Example 17 | 49.0 | 32.1 | 77 | 2.0 | 19.8 | 630 |
| Example 18 | 51.4 | 29.4 | 78 | 2.7 | 17.1 | 620 |
| Example 19 | 50.4 | 28.6 | 79 | 2.5 | 19.2 | 550 |
| Comparative Example 1 | 48 | 43 | 79 | — | 23.5 | 420 |
| Comparative Example 2 | 57 | 30 | 73 | — | 21.0 | 435 |
| Testing standard | GB3140 | GB3140 | GB3141 | ASTM D1238 | GB1040 | GB1040 |

*MFR, which was measured in conformity with ASTM D1238.
Testing condition: 200° C. under a load of 5.0 kg.

As shown in Table 4, the transparency of the resin composition provided in the present invention was superior to that of the PVC material for erythrocyte blood bags, and was equivalent to that of the PVC material for blood platelet bags. The haze of the resin composition provided in the present invention was less than that of the PVC material for erythrocyte blood bags, and was equivalent to that of the PVC material for blood platelet bag. The rigidity and tensile strength of the resin composition provided in the present invention was equivalent to those of the PVC materials for erythrocyte blood bags and blood platelet bags. The elongation at break of the resin composition provided in the present invention was higher than those of the PVC materials for erythrocyte blood bags and blood platelet bags. Thus, the resin composition provided in the present invention had good physical performance.

COMPARATIVE EXAMPLE 3

The PVC material for blood platelet bags from Baxter Corporation was fabricated into samples with an effective area of 50 cm$^2$ and a thickness of 0.45 mm.

Oxygen permeation of the PVC sample was measured according to ASTM D3985. The testing apparatus used was MOCON OX-TRAN MODEL 2/21 gas permeation tester from MOCON Corporation, USA. The testing time was 48 h and the oxygen concentration was 10%. Oxygen permeation of the samples was listed in Table 5. Table 5 presented gas permeation of the resin composition prepared in the Examples of the present invention and Comparative Examples. Carbon dioxide permeation of the PVC sample was tested according to GB/T 1038-2000. The testing apparatus used was VAC-V1 gas permeation tester from Jinan Languang M&E Technology Co., Ltd. Carbon dioxide permeation of the samples was listed in Table 5. Table 5 presented gas permeation of the resin composition prepared in the Examples of the present invention and Comparative Examples.

TABLE 5

Gas permeation of the resin compositions prepared in the Examples of the present invention and Comparative Examples

| Samples | Oxygen permeation rate (cm$^3$/(m$^2$ · 24 h)) | Carbon dioxide permeation (cm$^3$/m$^2$ · 24 h · 0.1 MPa) |
|---|---|---|
| Example 11 | 78 | 397.3 |
| Example 12 | 87 | 514.7 |
| Example 13 | 100 | 586.4 |
| Example 14 | 112 | 567.2 |
| Example 15 | 89 | 612.9 |
| Example 16 | 96 | 603.2 |
| Example 17 | 100 | 546.1 |
| Example 18 | 106 | 537.2 |
| Example 19 | 102 | 597.8 |
| Comparative Example 1 | 57 | 358.8 |
| Comparative Example 3 | 84 | 523.5 |

As shown in Table 5, generally, the oxygen permeation and carbon dioxide permeation of the resin composition provided in the present invention were higher than that of the PVC material for erythrocyte blood bags, and were equivalent to that of the PVC material for blood platelet bags from Baxter Corporation.

COMPARATIVE EXAMPLE 4

Five PVC whole blood bags produced by Shandong Weigao Group Medical Polymer Corporation Limited were filled with fresh human whole blood, and were stored at 5° C. for 35 days. The blood storage performance of the blood bags was examined, and the testing results were listed in Table 6. Table 6 presented blood storage performance of the blood bags made of the resin composition of the is Examples in the present invention and Comparative Example.

TABLE 6

Blood storage performance of the blood bags made of the resin compositions of the Examples in the present invention and Comparative Example

| Items | Example 20 | Example 21 | Example 22 | Comparative Example 4 |
|---|---|---|---|---|
| pH value | 6.9 ± 0.0 | 6.9 ± 0.0 | 6.9 ± 0.0 | 6.8 ± 0.0 |
| K$^+$ content (mmol/L) | 18.9 ± 0.6 | 16.9 ± 0.8 | 21.2 ± 0.4 | 25.0 ± 0.0 |
| Na$^+$ content (mmol/L) | 130.2 ± 0.7 | 138.3 ± 0.9 | 142.1 ± 1.1 | 123.8 ± 0.6 |
| Free haemoglobin (mg/L) | 100.2 ± 18.2 | 103.4 ± 20.1 | 98.1 ± 16.0 | 128.6 ± 23.1 |

As shown in Table 6, in the case of whole blood storage, the blood bags made of the resin composition of the present invention exhibited that the contents of free hemoglobin and K$^+$ were lower than those of the PVC whole blood bags produced by Shandong Weigao Group Medical Polymer Corporation Limited, and the content of Na$^+$ was higher than that of the PVC whole blood bags produced by Shandong Weigao Group Medical Polymer Corporation Limited. In view of this, the resin to composition provided in the present invention has good blood storage performance.

The above description of the Examples is only used to help to understand the methods and core ideas of the present invention. It should be noted that as for the ordinary skilled in the art, the present invention can also be conducted with a number of improvements and modifications without departing from the principle of the present invention. The improvements and modifications will also be protected by the present invention.

What is claimed is:

1. A resin composition consisting of a functionalized polypropylene (PP) and a functionalized styrenic thermoplastic elastomer (TPS), wherein the functionalized PP is a PP grafted with N-vinyl pyrrolidone (NVP) and glycidyl methacrylate (GMA), and the functionalized TPS is a TPS grafted with acrylamide or methacrylamide.

2. The resin composition of claim 1 wherein the functionalized PP and the functionalized TPS are used in a ratio of 1:2-1:10 by weight.

3. The resin composition of claim 1 wherein the amount of NVP is 1%-15% by weight of PP to be grafted.

4. The resin composition of claim 1 wherein the amount of GMA is 2%-10% by weight of PP to be grafted.

5. The resin composition of claim 1 wherein the PP is a copolymer of propylene with ethylene.

6. The resin composition of claim 1 wherein the amount of said acrylamide or methacrylamide is 1%-10% by weight of TPS to be grafted.

7. The resin composition of claim 1 wherein TPS is selected from the group consisting of styrene-b-(ethylene-co-butylene)-b-styrene (SEBS), styrene-b-(ethylene-propylene)-b-styrene (SEIS) and styrene-b-(ethylene-butylene-propylene)-b-styrene (SEBIS).

8. The resin composition of claim 1 wherein TPS has a styrene segment content of 10%-40% by weight.

9. The resin composition of claim 1, wherein said functionalized PP is prepared by: (a) pre-irradiating said PP, and (b) melting a blend comprising said pre-irradiated PP, NVP and GMA to obtain said functionalized PP.

10. The resin composition of claim 1, wherein said functionalized TPS is prepared by: (1) pre-irradiating TPS, and (2) melting a blend comprising said pre-irradiated TPS and acrylamide or methacrylamide to obtain said functionalized TPS.

* * * * *